(12) United States Patent
  Aplington

(10) Patent No.: US 11,465,824 B1
(45) Date of Patent: Oct. 11, 2022

(54) DISPENSER CAP AND METHOD OF USE

(71) Applicant: Daniel Joseph Aplington, Pacific Grove, CA (US)

(72) Inventor: Daniel Joseph Aplington, Pacific Grove, CA (US)

( * ) Notice: Subject to any disclaimer, the term of this patent is extended or adjusted under 35 U.S.C. 154(b) by 0 days.

(21) Appl. No.: 17/224,860

(22) Filed: Apr. 7, 2021

(51) Int. Cl.
  *B65D 83/00* (2006.01)
  *B65D 41/04* (2006.01)

(52) U.S. Cl.
  CPC ......... *B65D 83/0022* (2013.01); *B65D 41/04* (2013.01)

(58) Field of Classification Search
  CPC ............................ B65D 83/0022; B65D 41/04
  See application file for complete search history.

(56) References Cited

U.S. PATENT DOCUMENTS

| | | |
|---|---|---|
| 4,150,766 A | 4/1979 | Westendorf |
| 4,773,572 A * | 9/1988 | Stull ................... B65D 47/242 222/521 |
| 5,072,863 A * | 12/1991 | Stull ................... B65D 47/243 222/525 |
| 9,463,919 B2 | 10/2016 | Eini |
| 10,392,181 B2 | 8/2019 | Zonana |

FOREIGN PATENT DOCUMENTS

TW         I657968 B      5/2019

* cited by examiner

*Primary Examiner* — Donnell A Long
(74) *Attorney, Agent, or Firm* — Leavitt Eldredge Law Firm

(57) ABSTRACT

A dispenser cap includes a threaded top to mount to a container having a product stored therein, the threaded top having a CAM positioned within an interior; a base engaged with the threaded top; a transfer chamber positioned within an interior of the base and having an opening extending therein, the transfer chamber having a predetermined volume; a baffle ring engaged with the threaded top, the baffle ring having one or more openings to open and close between the threaded top and the transfer chamber such that the product can flow therethrough; and a plunger extending into the base and having an opposing CAM engaged with the CAM such that interaction cause opening and closing of the transfer chamber; rotation of the base relative to the threaded top causes the plunger to extend and contract such that product is loaded into the transfer chamber and dispensed from the transfer chamber.

6 Claims, 6 Drawing Sheets

DISPENSER CAP AND METHOD OF USE

BACKGROUND

1. Field of the Invention

The present invention relates generally to dispensing systems, and more specifically, to a dispenser cap for dispensing a predetermined amount of a product without the need for a secondary tool, such as a spoon or scoop.

2. Description of Related Art

Dispensing systems are well known in the art and are effective means to dispense a product to add the product to a container. Examples of conventional methods include the use of scoops and spoons for selecting a product to add to a container, such as a water bottle. These systems are generally not precise and are tedious for the user, wherein it is common for the product to be spilled.

It is an object of the present invention to provide for a dispenser cap that provides precise measurement of a product that also eliminates the need for a secondary tool, such as a spoon or scoop. The system of the present invention is therefore efficient and accurate.

Accordingly, although great strides have been made in the area of dispensing systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
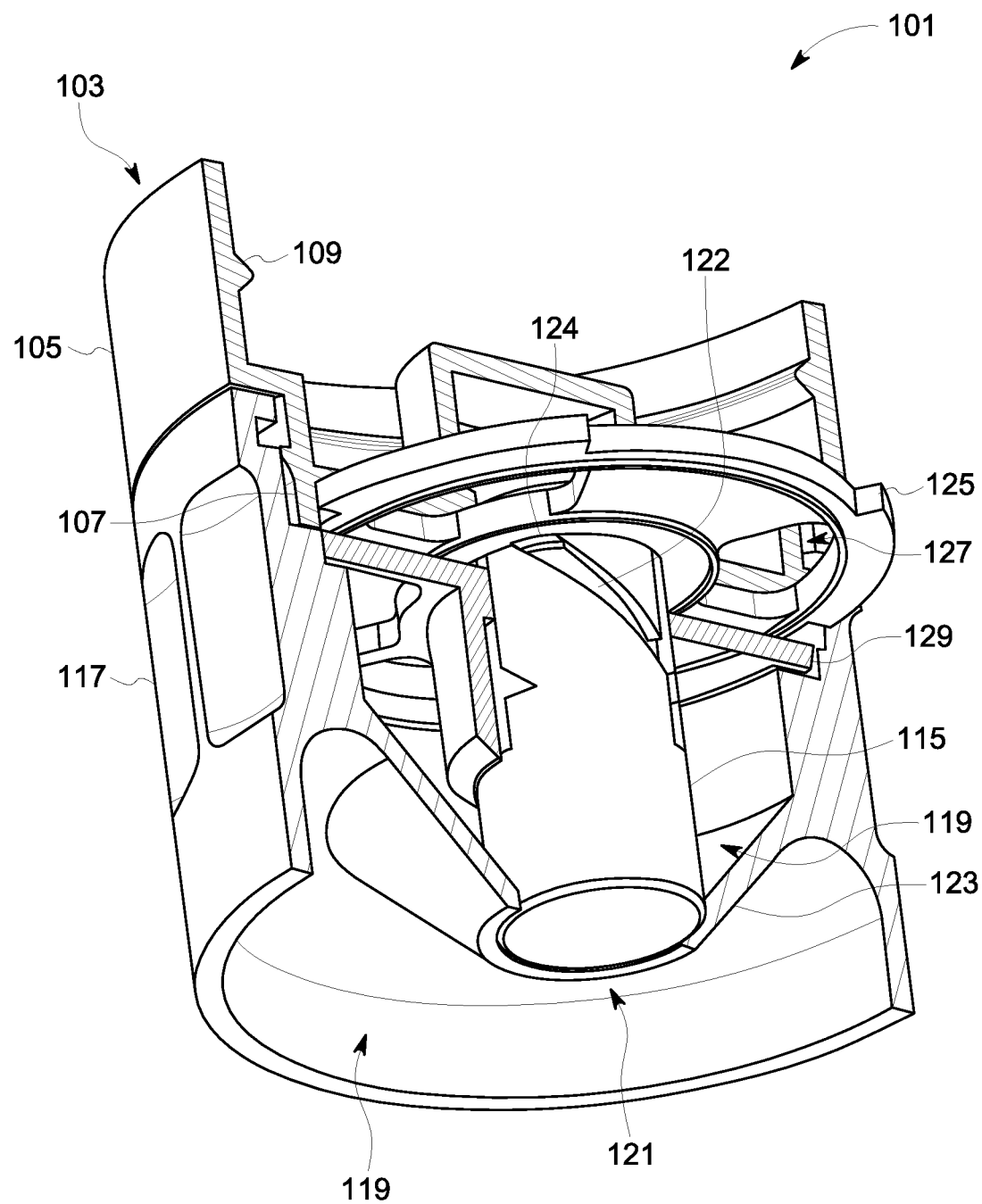
FIG. 1 is a cross sectional isometric view of a dispenser cap in accordance with the present invention, shown in a sealed state.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional dispensing systems. Specifically, the present invention provides for a dispenser cap that eliminates the need for spoons and scoops, specifically for powdered or granular products, thereby making the dispensing system more convenient for the end user. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
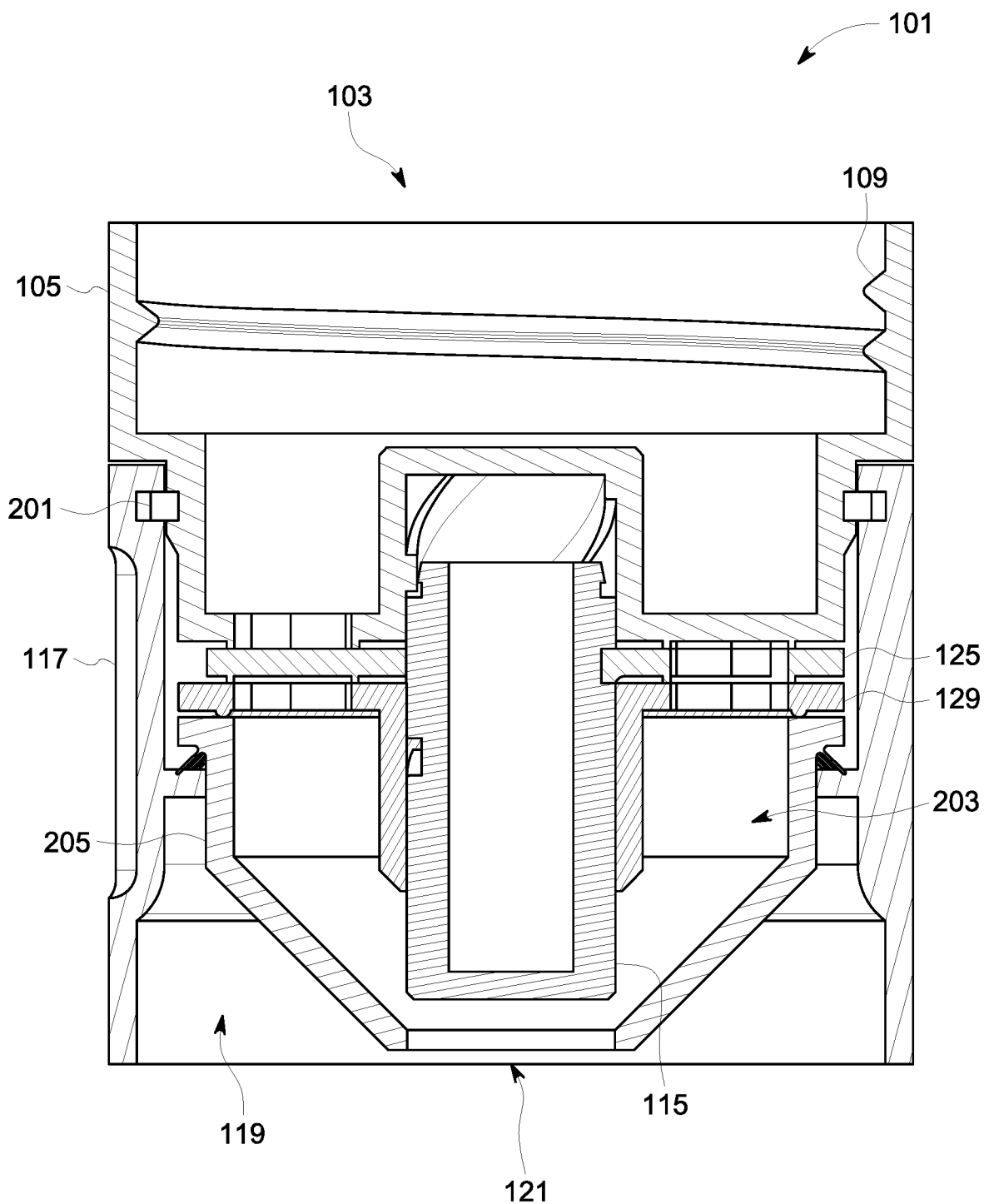
FIG. 2 is a side cross sectional view of an alternative embodiment of a dispenser cap in accordance with the present invention, shown in a partially open state.

Referring now to the drawings wherein like reference characters identify corresponding or similar elements throughout the several views, FIGS. 1 and 2 depicts cross sectional views of two embodiments of a dispenser cap 101 in accordance with the present application. The embodiments are substantially similar and the various features discussed herein can be adapted for either embodiment. Further, the teachings of each embodiment should adequately be applied to the other.

It will be appreciated that cap 101 overcomes one or more of the above-listed problems commonly associated with conventional dispensing systems.

In the contemplated embodiments, the cap 101 includes a threaded top 103, the threaded top configured to mount onto a container, wherein the container may include a product, such as a powdered or granular product. It should be appreciated that the product can vary. It should further be appreciated that the threaded top 103 may vary in size as needed for various containers.

The threaded top 103 may include a top portion 105 and a bottom portion 107, wherein the top portion has a larger diameter than the bottom. As further shown, threads 109 will be positioned within the interior of the threaded top 103 for engaging with the container. The threaded top further includes a CAM 111 positioned within the interior, wherein the cam 111 engages with an opposing CAM 122 of a plunger 115 such that the two CAMs interact to cause the plunger to extend and contract, as will be discussed in more detail herein.

Figure 5A:
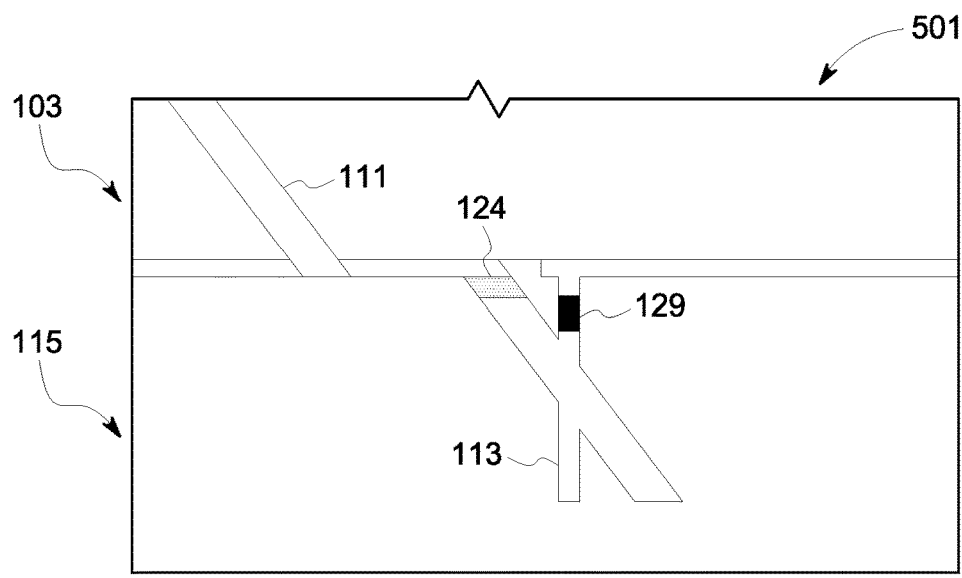
FIGS. 5A, 5B, and 5C is a series of flat views showing the loading, sealing, and dispensing of the dispenser cap of the present invention.
Figure 5B:
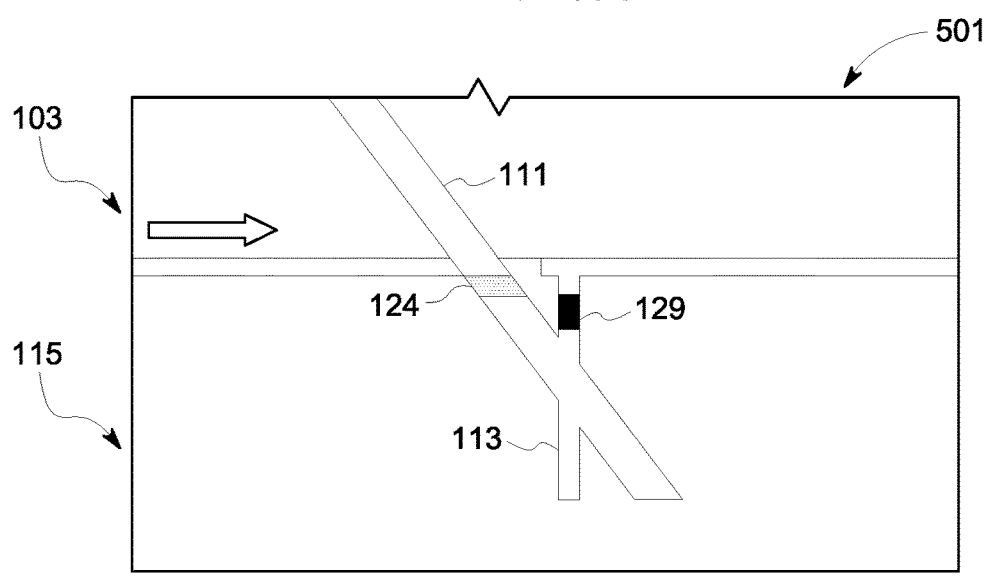
Figure 5C:
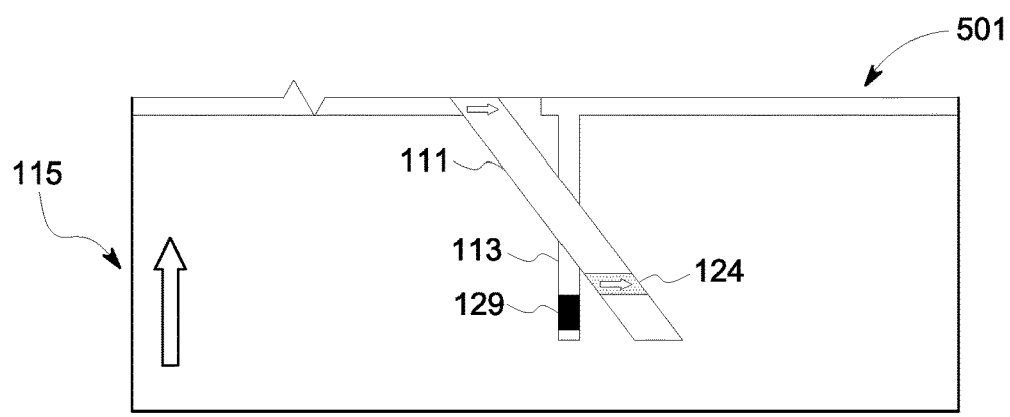

In FIG. 5, the engagement of CAM 111 and opposing CAM 122 is shown for clarity. As shown, the steps include loading, sealing, and dispensing as the threaded top 103 rotates relative to the base.

Cap 101 further includes a base 117 with an interior area 119. The base 117 engages with the threaded top 103. It is contemplated that various means of engagement can be used, however, in the preferred embodiment, a lock ring 201 secures the threaded top and the base together such that the threaded top and the base can rotate relative to one another.

In the preferred embodiment, the cap 101 further includes a transfer chamber 119, 203 positioned within an interior of the base and having an opening 121 extending therein, the transfer chamber having a predetermined volume. It should be appreciated that in various embodiments, the predetermined volume varies based on the needs of the user and as manufacturing considerations require.

It should be appreciated that the transfer chamber 119, 203 is different between FIGS. 1 and 2. Specifically, in FIG. 1, and with some embodiments, the transfer chamber is integral with the and made up from a portion 123 of the base. However, in alternative embodiments, and as shown in FIG. 2, the transfer chamber 203 is created by a separate chamber component 205.

As shown, the plunger 115 is configured to open and seal opening 121 based on rotation of the threaded top relative to the base 117 and the plunger 115. The plunger having one or more grooves 122 to engage with and rotate relative to one or more notches 124 of baffle ring 125.

Cap 101 further includes a baffle ring 125. As shown, the baffle ring 125 includes one or more openings 127, wherein the product will flow through. The baffle ring is configured to control flow from the container to the transfer chamber, lock the plunger during transfer chamber loading, and seal the top of the plunger guide from product ingress. This is further shown in FIGS. 4A and 4B and will be discussed further herein.

The system may further include a plunger guide 129 which will be keyed 130 to prevent rotation of the plunger within the base. The plunger guide further being configured to seal the transfer chamber from product spillage and contamination and seals the CAM mechanism from product ingress.

It should be appreciated that one of the unique features believed characteristic of the present application is that the dispenser cap allows for precise measurements of product within the chamber to be dispensed. This feature eliminates the need for secondary tools, such as spoons or scoops.

Figure 3A:
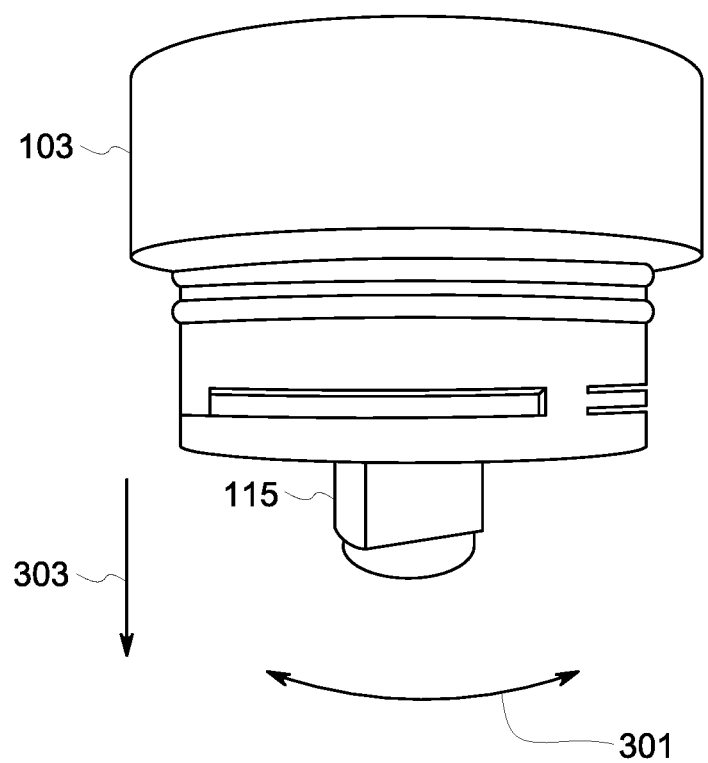
FIGS. 3A and 3B are side views of the operation of the dispenser cap of the present invention with the base removed for clarity.
Figure 3B:
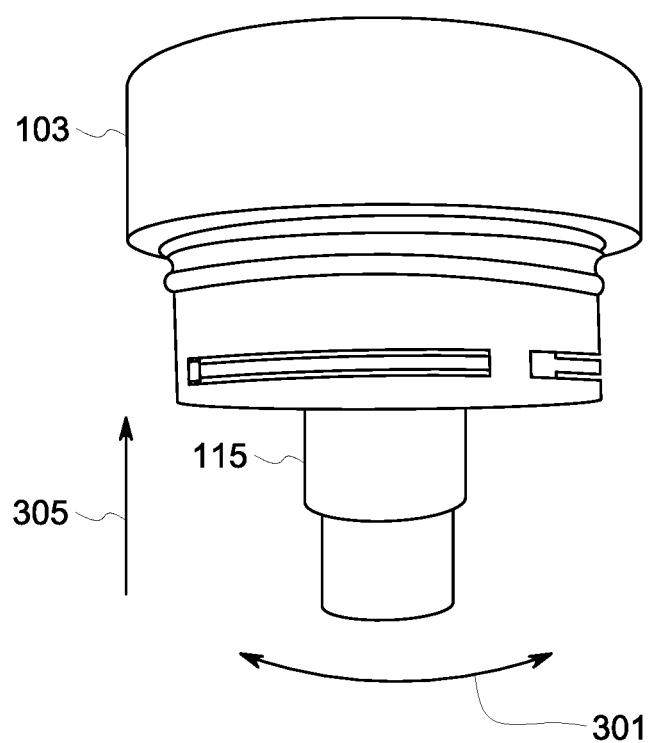

In FIGS. 3A and 3B, the extension and retraction of the plunger 115 is shown. As shown, when rotation 301 is provided between the top 103 and the plunger 115, the plunger will extend 303 or retract 305. This allows for the product to be loaded into the chamber and then dispensed from the base as needed by the user.

Figure 4A:
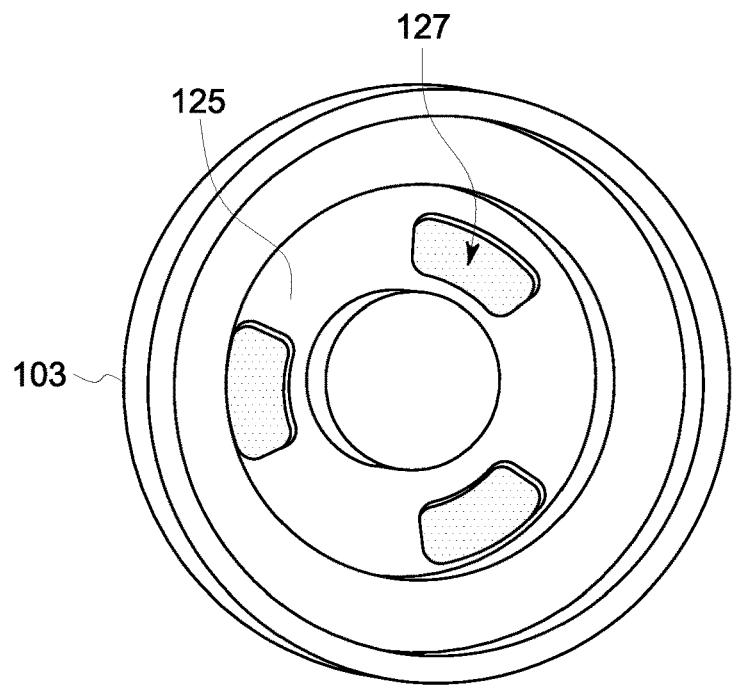
FIGS. 4A and 4B are top views of the operation of the dispenser cap of the present invention.
Figure 4B:
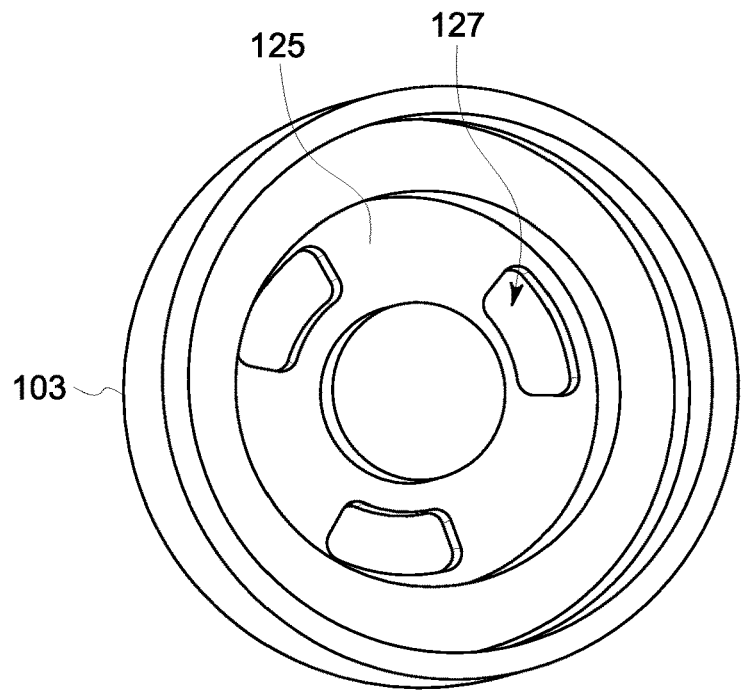

The loading of product is further shown in FIGS. 4A and 4B, wherein the one or more openings 127 of the baffle ring 125 are shown in a closed (FIG. 4A) and open (FIG. 4B) configuration. This allows for the loading of the transfer chamber again based on rotation.

Figure 6:
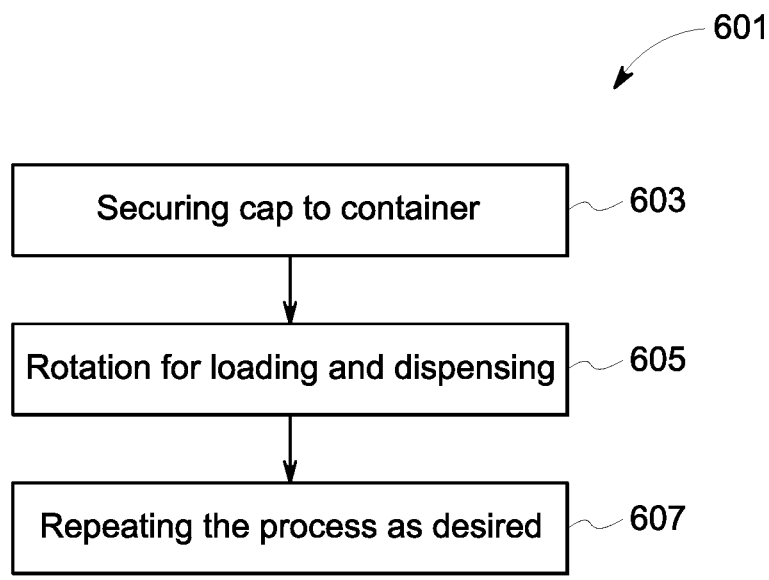
FIG. 6 is a flowchart of a method of use of the dispenser cap of the present invention.

In FIG. 6, a flowchart 601 depicts the method of use of the dispenser cap 101. During use, the cap is secured to a container, wherein the container holds a product, as shown with box 603. The user will then rotate the cap such that the product is loaded into the chamber and dispensed from the base, as shown with box 605. During the rotation, to achieve the loading and dispensing, in the preferred embodiment, the user will specifically rotate the base 60 degrees clockwise from the top to seal the transfer chamber. The user can then rotate the base 90 degrees clockwise from the top to dispense the product. After dispensing, the user will then rotate the base 150 degrees counterclockwise from the top to place the cap back in the loading position. The user can then proceed with this process as needed, as shown with box 607.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A dispenser cap, comprising:
    a threaded top having interior threads configured to mount to a container wherein a product is stored, the threaded top having:
        a CAM positioned within an interior of the threaded top;
    a base engaged with the threaded top;
    a transfer chamber positioned within an interior of the base and having an opening extending therein, the transfer chamber having a predetermined volume;
    a baffle ring engaged with the threaded top, the baffle ring having one or more openings configured to open and close between the threaded top and the transfer chamber such that the product can flow therethrough; and
    a plunger extending into the base, the plunger having an opposing CAM engaged with the CAM such that interaction between the opposing cam and the CAM cause opening and closing of the transfer chamber;
    wherein the threaded top and the base can rotate relative to one another; and
    wherein rotation of the base relative to the threaded top causes the plunger to extend and contract such that product is loaded into the transfer chamber and dispensed from the transfer chamber.

2. The dispenser cap of claim 1, wherein the transfer chamber is integral with the base.

3. The dispenser cap of claim 1, wherein the transfer chamber is a separate component from the base.

4. The dispenser cap of claim 1, wherein the threaded top further comprises:
    a top portion integral with a bottom portion, the top portion having a diameter greater than a diameter of the bottom portion;
    wherein the bottom portion secures within the interior of the base.

5. The dispenser cap of claim 1, further comprising:
    a plunger guide engaged with the interior of the base and engaged with one or more cutouts of the plunger;
    wherein the plunger guide is configured to lock the plunger within the base such that the plunger will rotate to open and close the transfer chamber.

6. The dispenser cap of claim 1, further comprising:
a lock ring securing the threaded top and the base together such that the threaded top and the base can rotate relative to one another.

* * * * *